United States Patent [19]

Penny

[11] Patent Number: 4,563,291

[45] Date of Patent: Jan. 7, 1986

[54] METHOD OF PREPARATION OF SUBSTITUTED AMINO-ALKYL SULFONIC ACID COMPOUNDS AND USE IN THE TREATMENT OF SUBTERRANEAN FORMATIONS

[75] Inventor: Glenn S. Penny, Duncan, Okla.

[73] Assignee: Halliburton Company, Duncan, Okla.

[21] Appl. No.: 632,770

[22] Filed: Jul. 20, 1984

[51] Int. Cl.$^4$ .............................. E21B 43/26
[52] U.S. Cl. .................. 252/8.55 R; 166/308; 252/315.3; 252/355; 260/513 N; 544/145; 544/398
[58] Field of Search ............... 252/8.55 R, 315.3; 260/513 N; 166/308

[56] References Cited

U.S. PATENT DOCUMENTS

| | | | |
|---|---|---|---|
| 1,944,300 | 1/1934 | Ott et al. | 260/513 N |
| 2,693,488 | 11/1954 | Sexton | 260/513 N |
| 3,888,312 | 6/1975 | Tiner et al. | 252/8.55 R X |
| 3,898,165 | 8/1975 | Ely et al. | 252/8.55 R |
| 3,974,077 | 8/1976 | Free | 252/8.55 R |
| 4,477,360 | 10/1984 | Almond | 252/8.55 R |

*Primary Examiner*—Herbert B. Guynn
*Attorney, Agent, or Firm*—Robert A. Kent; Thomas R. Weaver

[57] ABSTRACT

A method of manufacture of a substituted amino-alkyl sulfonic acid zwitterion is presented. The compound is prepared by the reaction of an epoxide with bisulfite which then is reacted with a secondary amine to form the amino-alkyl sulfonic acid or a salt thereof. Selected compounds can be utilized as a buffer composition to form viscosified fluids for use in the treatment of subterranean formations. The remaining amino-alkyl sulfonic acids or salts can be used as surfactants.

11 Claims, No Drawings

METHOD OF PREPARATION OF SUBSTITUTED AMINO-ALKYL SULFONIC ACID COMPOUNDS AND USE IN THE TREATMENT OF SUBTERRANEAN FORMATIONS

BACKGROUND OF THE INVENTION

The present invention relates to a method of preparation of amino-alkyl sulfonic acid compounds and the use of such compounds in the treatment of fluids utilized in the stimulation or other treatment of subterranean formations.

There has been a continuing need for buffering compositions in the pH range of about 6 to 8 for use in the treatment of subterranean formations since not many buffers have been known which are suitable in this pH range. Many fluids utilized in the treatment of subterranean formations, and particularly, those containing viscosifiers must have the pH of the fluid adjusted to a near neutral pH range to activate the viscosifier, any crosslinking agents that may be present or to stabilize the viscosified fluid against premature degradation.

Currently available buffer systems utilize bisulfites to maintain a pH near 7. The bisulfites are undesirable in certain instances because overtreatment can result in interference with the metal crosslinking agents that are utilized in many fluids, and it may react with various breakers utilized to provide a control break of the viscosified fluid. Various phosphates can be used to naturally buffer a fluid in the range of 6 to 8, however, the use of such phosphates is avoided due to interference with crosslinking agents that are utilized in various fluids.

It would be desirable to provide a compound which can be utilized to buffer a fluid for use in the treatment of subterranean formations in the pH range of 6 to 8, which does not adversely affect gel stability, which does not interfere with common fluid breakers and which does not adversely interfere with various crosslinking agents found in such fluids.

SUMMARY OF THE INVENTION

The discovery now has been made that substituted amino-alkyl sulfonic acid compounds can be readily produced by the dehydration of an alcohol containing sulfonate to an olefin in the presence of any secondary amine to form a compound having the general formulas:

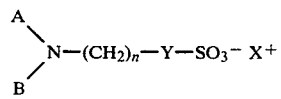
(Formula I)

or

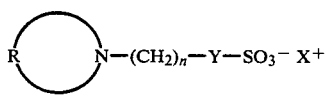
(Formula II)

wherein A and B are each independently an alkyl or aryl group or derivative thereof wherein the alkyl radical preferably contains from 1 to 18 carbon atoms, n is from about 2 to about 18, Y, if present, is a branched alkyl or aryl group wherein the alkyl radical preferably contains from 1 to 16 carbon atoms,

is a five to nine member cyclic radical comprising one or three ring nitrogen atoms, zero to two ring oxygen atoms and the remainder of the ring being carbon atoms, and X is hydrogen or any element having a positive charge such that an aqueous soluble salt of the acid is formed.

The compounds of this class, so produced, where n is about 2 to 3 and Y is absent have been found to provide buffering to a fluid containing viscosifying agents in a pH range of from about 6 to 8. The presence of the buffering compound does not interfere with various crosslinking agents, breakers or other additives present in a fluid utilized in the treatment of a subterranean formation. Those compounds in which Y is present have been found to function as surfactants.

DESCRIPTION OF THE PREFERRED EMBODIMENT

The alkyl sulfonic acid starting material of the present invention can be produced by the following method. Quantities of a bisulfite and an epoxide are charged to a reaction vessel wherein they are admixed for a sufficient period of time to yield to a reaction product having the general formula:

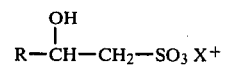

wherein R comprises, for example, hydrogen, methyl, ethyl or propyl radicals. Preferably, the epoxide and bisulfite are charged to the reaction vessel in substantially equal molar quantities to achieve maximum yield with a minimum waste of reactants. The reaction will occur substantially simultaneously with the admixing of the reactants. The reaction can be effected at substantially any temperature and pressure at which the reactants are capable of forming a homogeneous liquid solution and, preferably, the reaction is effected at about ambient temperature and pressure.

The bisulfite can comprise substantially any bisulfite salt capable of solubilization in an epoxide. Preferred bisulfites comprise the sodium, potassium, ammonium and the like salts.

The epoxide can comprise, for example, ethylene, propylene, butylene oxides and the like. The preferred epoxide is ethylene oxide which forms isethionic acid when reacted with bisulfite.

In a preferred embodiment of the invention, about equal molar quantities of sodium bisulfite and ethylene oxide are charged to a reaction vessel maintained at ambient temperature and pressure. The reactants are admixed and yield an aqueous solution of a salt of isethionic acid. When about equal molar quantities of the reactants are utilized, the yield will be approximately 100 percent resulting in about a 54 percent by weight aqueous solution of the sodium salt of isethionic acid.

Alternatively, the starting material may comprise any available hydroxyethyl-containing sulfonate.

A quantity of a secondary amine then is charged to the aqueous solution of the reaction products in the reaction vessel. The secondary amine can comprise, for example, diethanol amine, a piperazinyl compound or morpholinyl compound, dioxoazepinyl compound, triazepinyl compound or the like.

The secondary amine reacts with the other reactants present in the reaction vessel to yield a reaction product having the general formulas:

$$\begin{array}{c}A\\ \phantom{A}\diagdown\\ \phantom{AA}N-(CH_2)_n-Y-SO_3^- \; X^+\\ \phantom{AA}\diagup\\ B\end{array} \quad \text{(Formula I)}$$

or

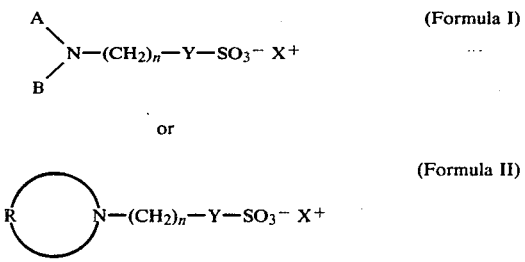
(Formula II)

wherein A and B are each independently an alkyl or aryl group or derivative thereof wherein the alkyl radical preferably contains from 1 to 18 carbon atoms, n is from about 2 to about 18, Y, if present, is a branched alkyl or aryl group wherein the alkyl radical preferably contains from 1 to 16 carbon atoms,

is a five to nine member cyclic radical comprising one or three ring nitrogen atoms, zero to two ring oxygen atoms and the remainder of the ring being carbon atoms, and X is hydrogen or any element having a positive charge such that an aqueous soluble salt of the acid is formed.

Preferably, A and B are each independently hydroxyethyl or thiol groups, n is from about 2 to 3, Y is lacking and

is a cyclic radical comprising one to two ring nitrogen atoms, zero or one ring oxygen atoms and the remainder of the ring being carbon atoms.

The amino-alkyl sulfonic acid or salt is produced by heating the reactants in the reaction vessel to near the boiling temperature of water under the existent pressure conditions. For example, at ambient temperature the reactants are heated to a temperature of about 200° F. whereupon the sulfonic acid or salt is produced. Preferably, the reaction vessel is provided with a cold finger trap whereby vaporized water produced as a by-product of the reaction can be removed. By removing the excess water from the reaction, the yield can be caused to approach 100 percent conversion. If the water from the reaction is not removed, the yield will be limited to a level of less than about 50 percent conversion which is considered to be economically undesirable. The yield of the reaction reaches about 100 percent when approximately 38 percent by weight of the initial reaction mixture has been separated as water in the trap.

In a preferred embodiment, diethanol amine is charged to the reaction vessel in a substantially equal molar quantity to a 54 percent aqueous solution the sodium salt of isethionic acid. The reactants then are heated to a temperature of about 200° F. at ambient temperature for a sufficient period of time to separate about 38 percent by weight of the reactants as water in the cold finger trap. The bis-hydroxyethylaminoethane sulfonic acid which is produced in about a 100 percent yield is diluted to about a 50 percent solution by the addition of water.

The surprising discovery now has been made that the amino-alkyl sulfonic acid or its salts of Formulas I or II in which Y is absent provide a beneficial buffering effect to fluids utilized in the treatment of subterranean formations and particularly to those fluids containing viscosifiers or viscosifiers and crosslinking agents which must be adjusted to a pH level in the range of from about 6 to 8 and, preferably, in the pH range of from about 6.5 to about 7.5.

In one embodiment of the present invention in which a liquid gel concentrate is utilized to form a high viscosity treating fluid, the amino-alkyl sulfonic acid or its salts of Formulas I or II in which Y is absent can be utilized to buffer the fluid composition to a pH in the range of 6.5 to 7.5 during hydration of the viscosifier to provide a stabilized fluid. A liquid gel concentrate is prepared by admixing a hydratable polymer such as a galactomannan, such as for example, guar or a guar derivative in an amount of from about several hundred to several thousand pounds per thousand gallons of aqueous in the presence of a base present in an amount sufficient to provide a pH above 9 and an inhibitor having the property of reversibly reacting with the hydratable polymer whereby the rate of hydration of the polymer is retarded for a significant period of time.

Hydratable polymers which are suitable for use in accordance with the present invention include polymers which contain, in sufficient concentration and reactive position, one or more of the functional groups hydroxyl, cis-hydroxyl, carboxyl, sulfate, sulfonate, amino or amide. Particularly suitable such polymers are polysaccharides and derivatives thereof which contain one or more of the following monosaccharide units: galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragancanth and carrageenan.

Hydratable synthetic polymers and copolymers which contain the above-mentioned functional groups and which can be utilized in accordance with the present invention include, but are not limited to, polyacrylate, polymethacrylate, polyacrylamide, maleic anhydride methylvinyl ether copolymers, polyvinyl alcohol, and polyvinylpyrrolidone.

When it is desired to utilize the liquid gel concentrate, the gel is diluted by the addition of an aqueous fluid containing from about 1 to about 10 pounds of the active amino-alkyl sulfonic acid or its salts per 1000 gallons of aqueous fluid. Alternatively, the compound is mixed with the liquid gel concentrate in an amount of from about 10 to about 100 pounds per 1000 gallons of gel concentrate. Typically, the gel is diluted to provide a polymer concentration of from about 10 to about 300 pounds per 1000 gallons of aqueous fluid.

Then, a quantity of any available liquid acid such as formic, acetic, dilute hydrochloric or the like is admixed with the solution to reduce the pH below about 9 and, preferably, to about neutral conditions. Upon addition of the liquid acid to the solution, the selected amino-alkyl sulfonic acid or salt buffers the pH of the solution to a range of from about 6.5 to about 7.5.

In a preferred method of utilizing the compound of the present invention, the amino-alkyl sulfonic acid or its salts is admixed with the neutralizing acid, for example, the acetic acid. The buffer acid mixture reduces the pH of the diluted gel concentrate to a level of about 6.5 to 7.5. The amino-alkyl sulfonic acid or its salt prevents accidental over treatment of the solution with acid resulting in too acid a pH, thereby causing premature degradation of the polymer and loss of fluid viscosity. The stabilized fluid then can be introduced into a subterranean formation for treatment of the formation. Typically, such treatment may comprise a fracturing treatment in which the viscosified fluid is utilized at elevated pressures to create fractures in the formation and then introduce a propping agent into the created fracture to maintain an open channel in the formation upon pressure reduction.

In another embodiment of the present invention, the amino-alkyl sulfonic acid or its salts can be utilized in the treatment of aqueous fluids utilized to prepare a gelled fluid. Aqueous fluids utilized to prepare gelled fluids often require treatment with caustic to effect bacteriological control. The pH of the caustic treated aqueous fluid then must be reduced to near neutral conditions to effect hydration of the polymer utilized to viscosify the fluid. The pH of the aqueous fluid can be adjusted by admixing the fluid with from about 1 to about 10 pounds of the amino-alkyl sulfonic acid or its salts of Formulas I or II in which Y is absent followed by a neutralizing quantity of an acid and the hydratable polymer or by simultaneously admixing the amino-alkyl sulfonic acid or its salts, neutralizing acid and hydratable polymer with the aqueous fluid.

Numerous problems arise when it is desired to viscosify a salt brine, such as for example, sea water. Normally, it is necessary to acidify the brine to a pH of about 1 before a viscosifier, such as for example, guar, a guar derivative or a hydratable cellulose derivative can be caused to hydrate and viscosify the fluid. Once hydrated, the pH of the salt brine must be raised to a more neutral level to prevent rapid degradation of the viscosifier and loss of fluid viscosity. The pH of the fluid cannot be raised too high, however, to avoid shear sensitive calcium crosslinking of the polymer and temperature instability of the fluid. In accordance with the present invention, a quantity of the amino-alkyl sulfonic acid or salt of Formulas I or II in which Y is absent is admixed with the viscosified brine prior to neutralization. The sulfonic acid or salt is admixed with the brine in an amount sufficient to provide buffering to the salt brine during neutralization such that a pH in the range of 6.5 to 7.0 can be maintained. The amino-alkyl sulfonic acid or salt is admixed with the acidic salt brine in an amount of generally from about 1 to about 10 pounds per 1000 gallons of aqueous fluid. Thereafter, substantially any solubilizable alkaline compound can be used to adjust the pH of the salt brine to a near neutral level without the necessity of precise measurement of the alkaline compound because of the buffering effect of the amino-alkyl sulfonate to the fluid.

In yet another embodiment of the present invention, a gelled fluid is prepared utilizing a hydratable polysaccharide having a molecular weight in excess of about 100,000, such as for example, guar or a guar derivative which is admixed with an aqueous fluid having a pH such that the polysaccharide will hydrate in the aqueous fluid. The gel which results, often being referred to as a base gel, then may be admixed with a solubilizable crosslinking agent comprising, for example, an organometallic chelate. The crosslinking agent is admixed with the base gel in an amount sufficient to crosslink at least a portion of the polymer present in said gelled fluid. The chelate can comprise, for example, titanium acetylacetonate, titanium lactate, titanium triethanolamine, zirconium acetylacetonate, zirconium lactate, zirconium triethanolamine, zirconium carbonate, zirconium diisopropylamine lactate and the like. To provide elevated temperature stability to the crosslinked gel which results from admixture of the crosslinking agent with the base gel, the pH of the base gel must be adjusted to near neutral conditions such as in the range of pH 6 to 8. If the pH is not adjusted to this range, the gel may prematurely degrade and lose viscosity, particularly when utilized at an elevated temperature such as above 120° F. in a subterranean formation.

Surprisingly, it has been found that the addition to the viscosified gel of a quantity of at least about one pound of an amino-alkyl sulfonic acid or salt per 1000 gallons of fluid with which the crosslinking agent may be admixed stabilizes the base gel and prevents overtreatment during any adjustment of the fluid pH level without adversely affecting the crosslinking agent. The amino-alkyl sulfonic acid or salt of Formulas I or II in which Y is absent stabilizes and buffers the pH of the gelled fluid to a level of about 6.5 to 7.5 during addition of the pH adjusting agent. The pH adjusting agent can comprise caustic or any other solubilizable alkaline compound. The stabilized gelled fluid then is introduced into a subterranean formation, for example by pumping down a well bore, under suitable conditions of flow rate and pressure to effect a desired treatment of the subterranean formation.

The present invention provides several advantages over known compounds utilized in the treatment of fluids utilized in the treatment of subterranean formations. The amino-alkyl sulfonic acid or salt does not interfere with the crosslinking agent to prevent or inhibit crosslinking of the gel. In known prior art techniques which utilize bisulfite salts as a buffer, the bisulfite often causes the metal compound in the crosslinking agent to be reduced which generally prevents the crosslinking reaction from occurring or significantly reduces its effectiveness. In contrast to the reduction reaction caused by bisulfite, phosphates, which are known to function as a buffer in aqueous fluids, form a chelate with the metal compound in the crosslinking agent which substantially prevents the crosslinking agent from crosslinking the base gel.

To further illustrate the present invention, and not by way of limitation, the following examples are provided.

EXAMPLE I

To illustrate the preparation of the amino-alkyl sulfonate by the method of the present invention, the following reactions were performed.

Forty-four grams of ethylene oxide (1 mole) is bled into a reaction vessel containing 104 grams of sodium bisulfite in water (45 percent by weight). The mixture is agitated at ambient temperature and 100 psi pressure during the addition of the bisulfite. The reactants interact to form an aqueous isethionic acid salt comprising 54 percent by weight sodium isethionate. A quantity of 105 grams of diethanolamine then is admixed with the solution and the admixture is heated to a temperature of about 200° F. at atmospheric pressure. The reaction vessel has a cold finger trap attached thereto in communication with the contents of the reaction vessel. As the reaction progresses, water is produced as a by-product of the reaction which vaporizes as it is formed together with the other water present and which is collected as ice crystals upon the cold finger trap. The heating is continued for approximately 4 hours after which approximately 38 percent by weight of the reactants (about 127 grams) in the reaction vessel have collected upon the cold finger trap as ice crystals. The remaining liquid reaction product is analyzed and found to comprise sodium N,N-bis-hydroxyethylaminoethanesulfonate.

EXAMPLE II

To illustrate the preparation of another amino-alkyl sulfonate by the method of the present invention, the following reactions were performed.

Forty-four grams of ethylene oxide (1 mole) is bled into a reaction vessel containing 104 grams of sodium bisulfite in water (45 percent by weight). The mixture is agitated at ambient temperature and 100 psi pressure during the addition of the bisulfite. The reactants interact to form an aqueous isethionic acid salt comprising 54 percent by weight sodium isethionate. A quantity of 86 grams of piperazine (1 mole) is admixed with the solution and the admixture is heated to a temperature of about 200° F. at atmospheric pressure. The reaction vessel has a cold finger trap attached thereto in communication with the contents of the reaction vessel. As the reaction progresses, water is produced as a by-product of the reaction which vaporizes as it is formed together with the other water present and which is collected as ice crystals upon the cold finger trap. The heating is continued for approximately 4 hours after which approximately 38 percent by weight of the reactants (about 127 grams) in the reaction vessel have collected upon the cold finger trap as ice crystals. The remaining liquid reaction product is analyzed and found to comprise sodium N-piperazineethanesulfonate. Further reaction with 44 grams of ethylene oxide (1 mole) at ambient conditions results in the formation of sodium N'-hydroxyethyl-N-piperazineethanesulfonate.

EXAMPLE III

To illustrate the preparation of another aminoalkyl sulfonate by the method of the present invention, the following reactions were performed.

Fifty-nine grams of propylene oxide (1 mole) is added to a reaction vessel containing 104 grams of sodium bisulfite in water (45 percent by weight). The mixture is agitated at ambient temperature and pressure during the addition of the bisulfite. The reactants interact to form an aqueous isopropyl sulfonic acid salt comprising 54 percent by weight sodium isopropylsulfonate. Eight-seven grams of morpholine (1 mole) then is admixed with the solution and the admixture is heated to a temperature of about 200° F. at atmospheric pressure. The reaction vessel has a cold finger trap attached thereto in communication with the contents of the reaction vessel. As the reaction progresses, water is produced as a by-product of the reaction which vaporizes as it is formed and which is collected as ice crystals upon the cold finger trap. The heating is continued for approximately four hours after which approximately 38 percent by weight of the reactants in the reaction vessel have collected upon the cold finger trap as ice crystals. The remaining liquid reaction product is analyzed and found to comprise sodium N-morpholinoisopropylsulfonate.

EXAMPLE IV

To illustrate the use of the compound of the present invention in the preparation of a gelled fluid, the following test was performed. A liquid gel concentrate is prepared by admixing 2500 pounds of potassium chloride, 800 pounds of hydroxypropyl guar, 40 pounds of caustic, 8 pounds of sodium borate and 40 pounds of hydroxyethylcellulose with about 1000 gallons of water.

An acid-buffer mixture is prepared by admixing a 75 percent by weight solution of N,N-bis-hydroxyethylaminoethanesulfonate of the present invention with glacial acetic acid and water in a volumetric ratio of 5:4:1 respectively.

A fracturing fluid is prepared by combining 75 gallons of the liquid gel concentrate with 925 gallons of water to provide a fluid containing 50 pounds of viscosifier per 1000 gallons of fluid. Approximately 1.25 gallons of the acid-buffer mixture is admixed with the water while the liquid gel concentrate is added to the water. The addition of the acid-buffer mixture reduces the pH of the fluid from about 13 to about 7 substantially instantaneously while also causing the hydration of the polymers present in the fluid resulting in viscosification of the fracturing fluid.

The viscosity of the fluid further is increased by admixing a quantity of an organometallic chelate comprising a solution of titanium triethanolamine (containing 2.5 percent by weight titanium) with the fracturing fluid in an amount of about 1.5 gallons. The viscosified fracturing fluid begins to complex as the organometallic chelate is dispersed in the fluid and the buffer of the present invention maintains the pH in the range of about 6.5 to about 7.5.

While that which is considered to be the preferred embodiment of the present invention has been described herein, it is to be understood that changes and modifications can be made by one skilled in the art in the methods and compositions described without departing from the spirit or scope of the invention as set forth in the appended claims.

What is claimed is:

1. A gelled fluid for use in the treatment of subterranean formations comprising:
   an aqueous fluid;
   a solvatable and hydratable polymer having a molecular weight in excess of about 100,000 present in an amount of from about 10 to about 300 pounds per 1000 gallons of aqueous fluid;
   an amino-alkyl sulfonic acid or salt of the general formula:

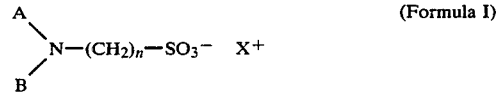

(Formula I)

or

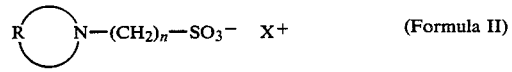

(Formula II)

wherein A and B are each independently an alkyl group containing from 1 to 18 carbon atoms or an aryl group, n is from about 2 to 3,

is a five to nine member cyclic radical comprising one to three ring nitrogen atoms, zero to two ring oxygen atoms and the remainder of the ring being carbon atoms and X is hydrogen or any element having a positive charge capable of forming a water soluble salt present in an amount of at least about 1 pound per 1000 gallons of aqueous fluid; and a pH adjusting agent present in an amount sufficient to adjust the pH level of the gel formed by hydration of the polymer by the aqueous fluid to a level in the range of from about 6 to 8.

2. The gelled fluid of claim 1 wherein said polymer comprises at least one member selected from the group consisting of guar gum, guar gum derivatives, locust been gum, tara, konjak, tamarind, starch, cellulose derivatives, xanthan, polyacrylate and polyacrylamide.

3. The gelled fluid of claim 1 wherein said amino-alkyl sulfonic acid or salt comprises sodium N,N-bis-hydroxyethylaminoethanesulfonate.

4. The gelled fluid of claim 1 wherein said amino-alkyl sulfonic acid or salt is present in an amount of from about 1 to about 10 pounds per 1000 gallons of aqueous fluid.

5. The gelled fluid of claim 1 defined further to contain a crosslinking agent present in an amount sufficient to crosslink at least a portion of the hydrated polymer in said gel.

6. The gelled fluid of claim 5 wherein said crosslinking agent comprises an organometallic chelate.

7. The gelled fluid of claim 5 wherein said crosslinking agent comprises at least one member selected from the group consisting of titanium acetylacetonate, titanium lactate, titanium triethanolamine, zirconium acetylacetonate, zirconium lactate, zirconium triethanolamine, zirconium carbonate and zirconium diisopropylamine lactate.

8. A method of treating a subterranean formation which comprises:

admixing an aqueous fluid with a hydratable polymer having a molecular weight excess of about 100,000 present in an amount of at least about 10 pounds per 1000 gallons of aqueous fluid to form a gase gel;

admixing an amino-alkyl sulfonic acid or salt of the general formual:

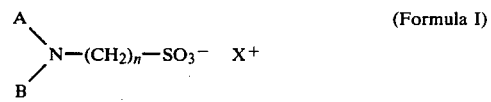 (Formula I)

or

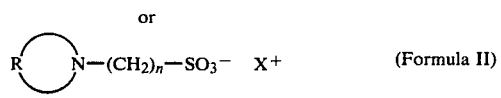 (Formula II)

wherein A and B are each independently an alkyl group containing from 1 to 18 carbon atoms or an aryl group, n is frim about 2 to 3,

is a five to nine member cyclic radical comprising one to three ring nitrogen atoms, zero to two ring oxygen atoms and the remainder of the ring being carbon atoms, and X is hydrogen or any element having a positive charge capable of forming a water soluble salt of said amino-alkyl sulfonic acid with said base gel in an amount of at least about 1 pound per 1000 gallons of aqueous fluid to stabilize said base gel, introducing said stabilized gel into said subterranean formation at a predetermined flow rate and pressure to effect fracturing of said subterranean formation.

9. The method of claim 8 defined further to include the step of:

admixing a crosslinking agent with said base gel in an amount sufficient to effect crosslinking of at least a portion of said polymer present.

10. The method of claim 9 wherein said crosslinking agent comprises at least one member selected from the group consisting of titanium acetylacetonate, titanium lactate, titanium triethanolamine, zirconium acetylacetonate, zirconium lactate, zirconium triethanolamine, zirconium carbonate and zirconium diisopropylamine lactate.

11. The method of claim 8 wherein said amino-alkyl sulfonic acid or salt comprises N,N-bis-hydroxyethylaminoethanesulfonic acide or a salt thereof.

* * * * *